(12) United States Patent
Missalla et al.

(10) Patent No.: US 8,657,934 B2
(45) Date of Patent: Feb. 25, 2014

(54) CYCLONE FOR SEPARATING STICKY PARTICLES FROM GAS STREAMS

(75) Inventors: Michael Missalla, Oberursel (DE); Mithat Schmitz, Koenigstein (DE)

(73) Assignee: Outotec Oyj, Espoo (FI)

( * ) Notice: Subject to any disclaimer, the term of this patent is extended or adjusted under 35 U.S.C. 154(b) by 122 days.

(21) Appl. No.: 13/497,120

(22) PCT Filed: Aug. 4, 2010

(86) PCT No.: PCT/EP2010/004780
§ 371 (c)(1),
(2), (4) Date: Mar. 20, 2012

(87) PCT Pub. No.: WO2011/032620
PCT Pub. Date: Mar. 24, 2011

(65) Prior Publication Data
US 2012/0180662 A1    Jul. 19, 2012

(30) Foreign Application Priority Data

Sep. 21, 2009 (DE) .......................... 10 2009 042 013

(51) Int. Cl.
*B01D 45/12*    (2006.01)

(52) U.S. Cl.
USPC ............. 95/271; 55/458; 55/459.1; 55/459.2; 55/459.3; 55/459.5

(58) Field of Classification Search
USPC .............. 55/458, 459.1, 459.2, 459.3, 459.5; 95/271
See application file for complete search history.

(56) References Cited

U.S. PATENT DOCUMENTS

| | | | | |
|---|---|---|---|---|
| 3,513,642 A | * | 5/1970 | Cornett | 55/399 |
| 3,745,752 A | * | 7/1973 | Gallaer | 55/418 |
| 4,848,993 A | * | 7/1989 | Elkjaer | 55/459.1 |
| 4,901,448 A | | 2/1990 | Rother et al. | |
| 6,926,749 B1 | * | 8/2005 | Tenney | 55/459.1 |
| 6,938,780 B2 | * | 9/2005 | Baglione et al. | 209/717 |

FOREIGN PATENT DOCUMENTS

| | | |
|---|---|---|
| CN | 166 966 4 A | 9/2005 |
| CN | 293 643 9 Y | 8/2007 |
| DE | 2349027 A1 | 4/1975 |
| DE | 8811275 U1 | 10/1988 |
| DE | 8807793 U1 | 12/1988 |
| DE | 19858675 A1 | 2/2000 |
| EP | 0 056 357 A2 | 7/1982 |
| EP | 0094098 A1 | 11/1983 |
| EP | 0342340 A2 | 11/1989 |
| EP | 0346748 A2 | 12/1989 |
| JP | 61068152 A | 4/1986 |

OTHER PUBLICATIONS

European Patent Office, International Search Report in International Patent Application No. PCT/EP2010/004780 (Nov. 9, 2010).

* cited by examiner

*Primary Examiner* — Dung H Bui
(74) *Attorney, Agent, or Firm* — Leydig, Voit & Mayer, Ltd.

(57) ABSTRACT

A cyclone for separating sticky particles from gas streams includes an inlet duct having an end in a direction of a particle outlet. The end has a flow cross-section including a triangular expansion that is formed laterally by a vertical of a cylindrical outer wall of the cyclone and by art outer boundary of the cyclone. An outer angle of inclination between the vertical and the outer boundary, proceeding from the end of the inlet duct, is reduced from 30° to 0° in a flow direction of gas streams. An immersion tube is disposed eccentrically in a direction of the inlet duct.

5 Claims, 2 Drawing Sheets

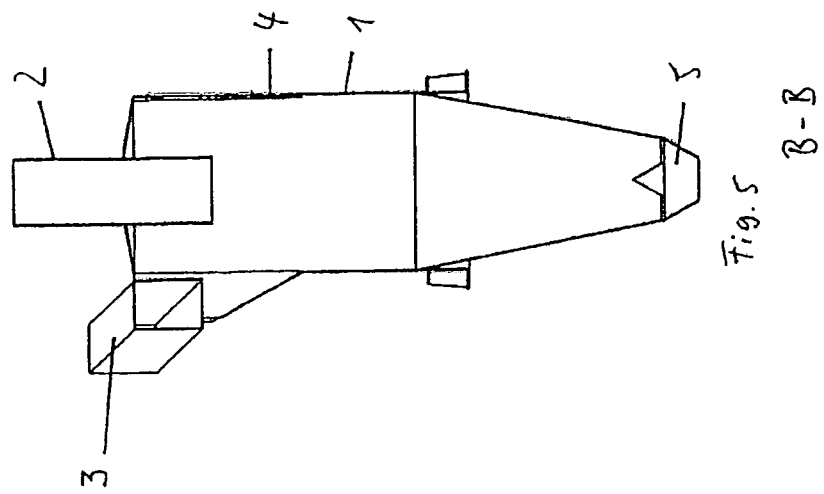
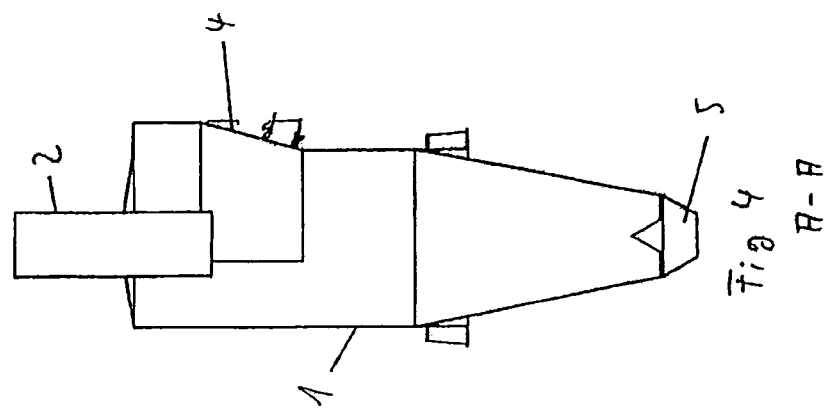

2

CYCLONE FOR SEPARATING STICKY PARTICLES FROM GAS STREAMS

CROSS-REFERENCE TO PRIOR APPLICATIONS

This application is a U.S. National Phase application under 35 U.S.C. §371 of International Application No. PCT/EP2010/004780, filed on Aug. 4, 2010, and claims benefit to German Patent Application No. DE 10 2009 042 013.4, filed on Sep. 21, 2009. The International Application was published in English on Mar. 24, 2011 as WO 2011/032620 under PCT Article 21(2).

FIELD

This invention relates to a cyclone for separating sticky particles from gas streams and to a use of the cyclone.

BACKGROUND

Centrifugal separators in the form of cyclones are known. In gas cleaning, for example, they serve for separating solid particles contained in the gases. The gases are put into a rotary movement due to their own flow velocity and the corresponding constructive design of the cyclone. The centrifugal forces acting on the particles accelerate the same radially to the outside. They are thereby separated from the gas stream which is passed to the inside and discharged. When the gases to be cleaned contain sticky particles, however, it is disadvantageous when accretions of particles occur inside the cyclone, which leads to a deterioration of the separation efficiency of the cyclone. The gas cleaning in the cyclone must then be interrupted with great effort and the cyclone must be liberated from the accretions, so that the separation efficiency of the cyclone can again be increased.

SUMMARY

In an embodiment, the present invention provides a cyclone for separating sticky particles from gas streams including an inlet duct having an end in a direction of a particle outlet. The end has a flow cross-section including a triangular expansion that is formed laterally by a vertical of a cylindrical outer wall of the cyclone and by an outer boundary of the cyclone. An outer angle of inclination between the vertical and the outer boundary, proceeding from the end of the inlet duct, is reduced from 30° to 0° in a flow direction of gas streams. An immersion tube is disposed eccentrically in a direction of the inlet duct.

BRIEF DESCRIPTION OF THE DRAWINGS

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following:

FIG. 4 shows the cyclone for separating sticky particles from gas streams according to section A-A in FIG. 2; and FIG. 5 shows the cyclone for separating sticky particles from gas streams according to section B-B in FIG. 2.

Figure 3:
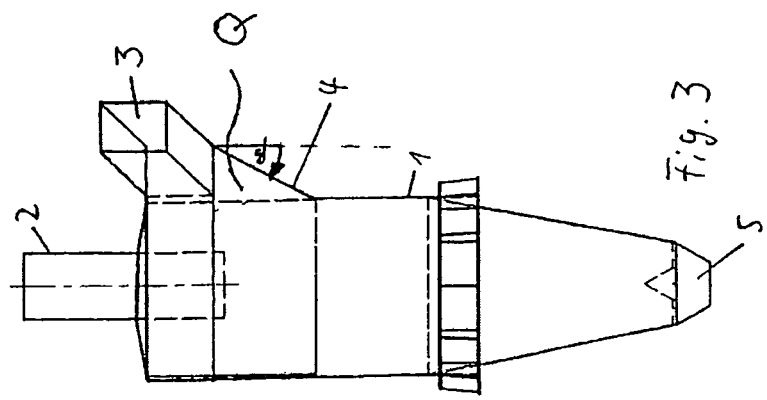
FIG. 3 shows the cyclone for separating sticky particles from gas streams with a view to the inlet duct.

Reference numerals not shown in a particular figure can be gleaned from the other figures.

DETAILED DESCRIPTION

In an embodiment, the invention provides a cyclone for separating sticky particles from gas streams, in which accretions of sticky particles in the interior can be avoided almost completely. In another embodiment, the invention provides a use of the cyclone.

In an embodiment, the invention provides a cyclone for separating sticky particles from gas streams, in which the flow cross-section at the end of the inlet duct has a triangular expansion Q in direction of the particle outlet, which laterally is formed by the cylindrical outer wall and by an outer boundary, wherein the outer angle of inclination β between the outer boundary and the vertical, proceeding from the end of the inlet duct, extends from 30° to 0° in the flow direction of the gas streams. Sticky particles are understood to be particles which are characterized by adhesiveness. In general, they have cohesive forces which promote the formation of accretions in processing plants. The actual stickiness can also occur for example due to the mechanical entanglement and cross-linkage of filamentary surface structures.

When the particles are present in the nanometer range, the stickiness is also realized by atomic forces such as van der Waals forces or hydrogen bridge bonds. The angle of inclination β extends from 30° to 0°, which results in the fact that the formation of the triangular expansion Q is formed increasingly narrow as seen in gas direction, until it finally no longer is present when reaching the angle of inclination β of 0°. The outer boundary then coincides with the cylindrical outer wall. It was surprisingly found that accretions of the sticky particles in the interior of the cyclone can be avoided almost completely by the corresponding formation of the triangular expansion Q. Sharp transitions at edges, which according to the prior art generally initiate or promote a formation of accretions, are avoided in an advantageous way.

In an embodiment, the invention provides that the inlet duct is arranged with an inclination in flow direction towards the particle outlet and the angle of inclination α is between 10° and 45°. In this way, the introduction of the gas streams which contain sticky particles into the upper part of the cyclone advantageously is facilitated, since almost no accretions can form at the transition of the inlet duct to the triangular expansion Q.

In accordance with a further preferred aspect of the invention it is provided that the immersion tube is arranged eccentrically in direction of the inlet duct. It is advantageous that it is ensured that upon introduction of the gas streams into the cyclone the majority of sticky particles from the gas streams do not impinge on the immersion tube and partly adhere to the same. Most of the sticky particles thus are advantageously guided past the immersion tube and subjected to the centrifugal forces.

In an embodiment, invention provides that the inner wall of the cyclone has a non-stick coating. Preventing accretions of sticky particles thus is promoted in addition. Depending on the procedural process, different materials can be used as a non-stick coating. For some applications, the use of polytetrafluoroethylene as a non-stick coating was quite successful.

In another embodiment, the invention provides the use of the cyclone for separating partly molten particles. These partly molten particles for example can be plastic particles, which must be transported in relatively hot gas streams and be separated from the same. These partly molten particles do not stick together in the cyclone, but reach the particle outlet without forming accretions inside the cyclone.

Figure 1:
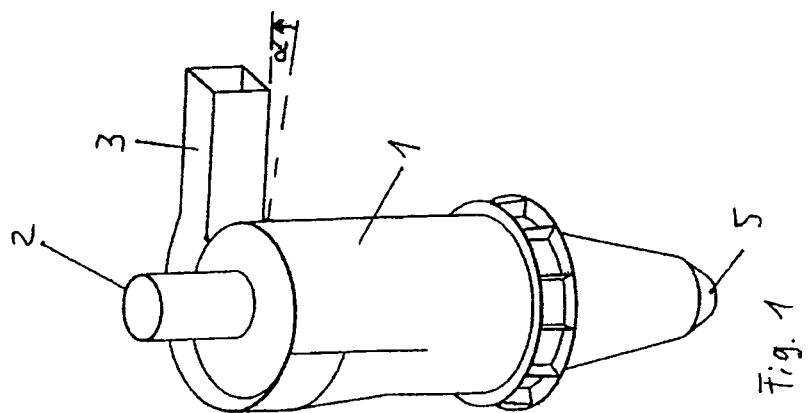
FIG. 1 shows a cyclone for separating sticky particles from gas streams in according to an exemplary embodiment of the invention in three-dimensional form.

In FIG. 1, the cyclone for separating sticky particles from gas streams is shown in three-dimensional form. It includes a cylindrical outer wall 1, an inlet duct 3 and a particle outlet 5. Furthermore, an immersion tube 2 is provided, which is arranged eccentrically in the direction of the inlet duct 3. The inlet duct 3 is arranged with an inclination in flow direction towards the particle outlet 5, wherein the angle of inclination α lies in the range between 10° and 45°.

Figure 2:
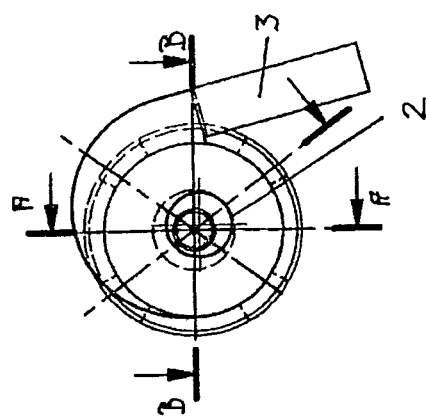
FIG. 2 shows a top view of the cyclone for separating sticky particles from gas streams.

In FIG. 2, the top view of the cyclone for separating sticky particles from gas streams is shown. The immersion tube 2 is arranged eccentrically in direction of the inlet duct 3.

In FIG. 3, the cyclone for separating sticky particles from gas streams is shown with a view to the inlet duct 3. At the end of the inlet duct 3 in direction of the particle outlet 5, the flow cross-section has a triangular expansion Q which laterally is formed by the cylindrical outer wall 1 and by an outer boundary 4. The outer angle of inclination β between the outer boundary 4 and the vertical extends from 30° to 0° (not shown), proceeding from the end of the inlet duct 3 in flow direction of the gas streams. Due to the constructive design of the cyclone, accretions of sticky particles from the gas streams in the interior of the cyclone can be avoided in an advantageous way.

In FIG. 4, the cyclone for separating sticky particles from gas streams is shown according to section A-A in FIG. 2. Proceeding from 30°, the angle of inclination β is formed smaller than is shown in FIG. 3. The angle of inclination β here is 25°, so that in this position the triangular expansion Q is smaller than in the position shown in FIG. 3.

In FIG. 5, the cyclone for separating sticky particles from gas streams is shown according to section B-B in FIG. 2. In this position, the angle of inclination β is 0°, so that here the cylindrical outer wall 1 coincides with the outer boundary 4. Thus, the triangular expansion Q no longer is formed in this position.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

The invention claimed is:

1. A cyclone for separating sticky particles from gas streams, comprising:
    an inlet duct having an end in a direction of a particle outlet, the end having a flow cross-section including a triangular expansion that is formed laterally by a vertical of a cylindrical outer wall of the cyclone and by an outer boundary of the cyclone, an outer angle of inclination between the vertical and the outer boundary, proceeding from the end of the inlet duct, being reduced from 30° to 0° in a how direction of gas streams; and
    an immersion tube disposed eccentrically in a direction of the inlet duct.

2. The cyclone according to claim 1, wherein the inlet duct is disposed with an angle of inclination in the direction of the particle outlet between 10° and 45°.

3. The cyclone according to claim 2, wherein an inner wall of the cyclone includes a non-stick coating.

4. The cyclone according to claim 1, wherein an inner wall of the cyclone includes a non-stick coating.

5. A method of using a cyclone, comprising:
    providing an inlet duct having an end in a direction of a particle outlet, the end having a flow cross-section including a triangular expansion that is formed laterally by a vertical of a cylindrical outer wall of the cyclone and by an outer boundary of the cyclone, an outer angle of inclination between the vertical and the outer boundary, proceeding from the end of the inlet duct, being reduced from 30° to 0° in a flow direction of gas streams;
    providing an immersion tube disposed eccentrically in a direction of the inlet duct; and
    providing partly molten particles to the inlet duct so as separate the partly molten particles from a gas stream.

* * * * *